United States Patent [19]

Curtis et al.

[11] Patent Number: 5,129,436
[45] Date of Patent: Jul. 14, 1992

[54] APPARATUS FOR FORMING SHAPED EDGES

[75] Inventors: Robin B. Curtis; Vernon K. Noriss, both of Christchurch, New Zealand

[73] Assignee: Astor Post-Formed Components Ltd., Christchurch, New Zealand

[21] Appl. No.: 567,628

[22] Filed: Aug. 15, 1990

[30] Foreign Application Priority Data

Aug. 15, 1989 [NZ] New Zealand ............... 230302
Oct. 2, 1989 [NZ] New Zealand ............... 230849

[51] Int. Cl.⁵ .................................................. B27C 5/00
[52] U.S. Cl. .................................. 144/142; 144/137;
144/144 R; 144/372; 144/134 R; 409/125;
409/130
[58] Field of Search .................... 144/134 R, 137, 142,
144/144 R, 144 A; 409/125, 130

[56] References Cited

U.S. PATENT DOCUMENTS

| | | | |
|---|---|---|---|
| 3,165,976 | 1/1965 | Haspel | 144/144 R |
| 3,541,922 | 11/1970 | Dunlap | 144/144 R |
| 3,865,162 | 2/1975 | Schmidt | 144/144 R |
| 4,288,185 | 9/1981 | Lenz | 409/108 |
| 4,605,049 | 8/1986 | Giordanengo et al. | 144/144 R |

Primary Examiner—W. Donald Bray
Attorney, Agent, or Firm—Ross, Ross & Flavin

[57] ABSTRACT

An apparatus for forming shaped edges which includes a support table, means for securing components to be shaped to the support table, and shaping means which are mounted upon the table and can be moved relative to the table. The shaping means is guided for at least part of its travel by cam means which are arranged to guide the shaping means so as to cut profiles of predetermined shape in the components to be shaped.

5 Claims, 3 Drawing Sheets

APPARATUS FOR FORMING SHAPED EDGES

BACKGROUND OF THE INVENTION

1. Field of the Invention

The present invention relates to apparatus for forming shaped edges which co-operate to form a neat, high-precision joint. The apparatus of the present invention has been designed with especial reference to the cutting of bench top components which are to be joined together with a "masons mitre" type of joint, and will be described with especial reference to this application, but it will be appreciated that the apparatus could be used in any application where similar requirements apply.

2. Description of the Prior Art

Bench tops generally are made of wood or wood product board such as "Customwood" (Trade Mark) or particle-board. The edge of the bench generally is reinforced to double-thickness, and the top surface of the board generally is clad with a laminate such as "Melteca" or "Formica" (Trade Marks). Thus, cutting a shaped edge of precise shape is not easy: the cutter must cut accurately through a considerable thickness of board, without splintering the laminate or the board. Any inaccuracy or roughness will result in an ill-fitting and unsightly joint.

Hitherto, joints of this type have been cut with a spindle-moulder, and hand-finished with a file or a plane, or cut with a hand-held router, in a jig. Both methods are relatively slow, and need a skilled operator for consistently good results.

BRIEF SUMMARY OF THE INVENTION

It is therefore an object of the present invention to provide apparatus capable of overcoming the above-described drawbacks.

The present invention provides apparatus comprising: a support table; means for securing components to be shaped to said table; and shaping means mounted upon said table and movable relative thereto; said shaping means being guided for at least part of its travel by cam means arranged to guide said shaping means to cut in said components profiles of predetermined shape.

Preferably, said shaping means includes a frame supporting two routers, mounted so that the router blades rotate in opposite senses.

Preferably also, two components are cut simultaneously: one component is secured to one side of the table, the other components to its other side, and the shaping means is arranged to travel between said components, in a slot formed down the centre of the table.

BRIEF DESCRIPTION OF THE DRAWINGS

By way of example only, two preferred embodiments of the present invention are described in detail with reference to the accompanying drawings, in which.

DETAILED DESCRIPTION OF PREFERRED EMBODIMENTS

Figure 1:
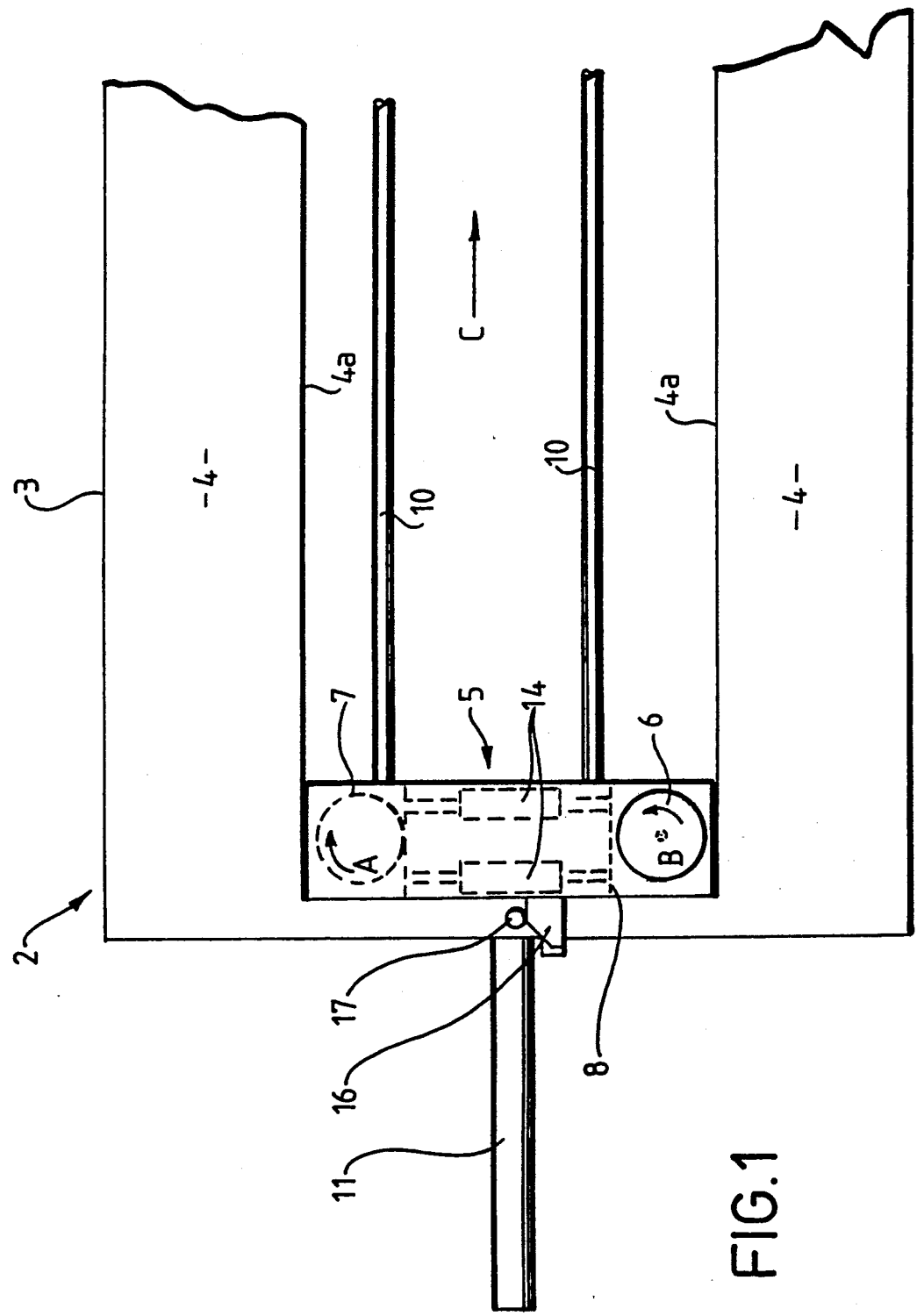
FIG. 1 is a plan view of part of the apparatus of the present invention.
Figure 2:
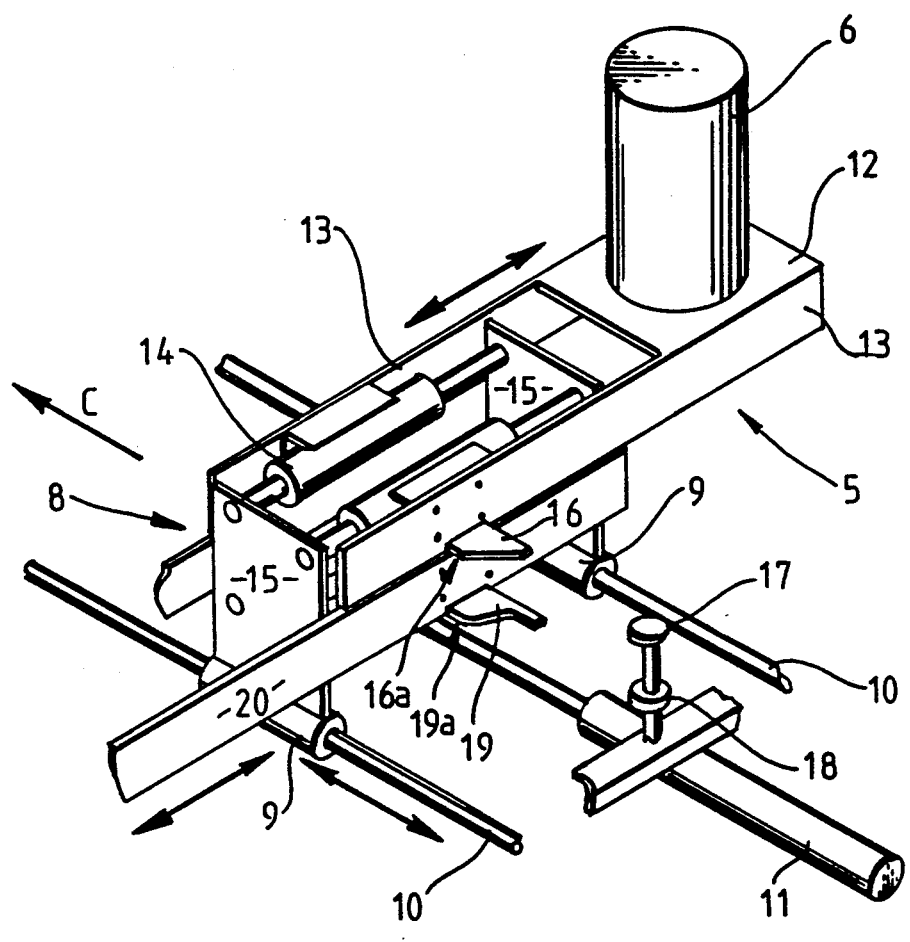
FIG. 2 is an isometric view of part of the apparatus of a first embodiment of the present invention.

Referring to FIGS. 1 and 2 and a first preferred embodiment, the apparatus 2 comprises a table 3 which provides two co-planar surfaces 4 for supporting the bench components (not shown) to be shaped, and shaping equipment 5 mounted between said surfaces 4. The surfaces 4 are substantially horizontal, and bench components to be shaped lie flat, one on each of said surfaces, with the edges to be shaped adjacent the inner-edges 4a of said surfaces. In use, the bench components are held in place by pneumatically-operated clamps (not shown) which press the bench components down into tight engagement with the surfaces 4.

The shaping equipment 5 includes a pair of routers 6, 7, of known type, both mounted in a supporting frame 8 with the router blades vertical, and with one router above the table and the other below, so that the blades of both routers contact the corresponding bench component to be cut in the same direction of rotation: it is important for the formation of a clean cut that the router blade rotates so as to push the bench component away from the blade, or the component will tend to catch on the blade, and the cut will be ragged. The directions of rotation of the router blades are indicated by arrows A and B in FIG. 1.

The supporting frame 8 is mounted on bearings 9 which travel on spaced parallel rails 10, extending along the length of the table 3. The frame 8 is moved along the rails 10 by a pneumatic ram 11 mounted between the table 3 and the frame 8.

FIG. 2 shows in detail the mounting of one of the routers 6; the other router 7 (not shown) is mounted in exactly the same manner, but in reverse, with the body of the router below the table. The router 6 is supported upon a plate 12, with the longitudinal axis of the router blade vertical. The plate 12 is rigidly secured to a pair of arms 13, each of which is rigidly secured to the body of one of a pair of parallel pneumatic cylinders 14. The cylinders 14 are of the through-rod type, and the ends of the rod are secured one to each of a pair of parallel vertical plates 15, mounted on the bearings 9. A cam plate 16 having the required profile for the bench component to be cut by the router 6 is mounted on the arm 13 adjacent the end of the table 3; in the starting position of the apparatus, said cam plate 16 bears against one of a pair of co-axial cam followers 17, 18, mounted on the adjacent end of the table.

A second cam plate 19, secured to a corresponding arm 20 associated with the router 7 (not shown in FIG. 2) bears against the cam follower 18.

The pneumatic cylinders associated with both routers 6, 7 are set to bias each of the cam plates 16, 19, firmly against the corresponding follower.

The above-described apparatus is used as follows: the two board components to be shaped are placed one on each surface 4, with the inner edge of each board component projecting inwards of the edge of said surface 4, and are clamped in these positions by the pneumatically-operated clamps.

The shaping equipment 5 is initially in the starting position shown in FIG. 1, in which both cam followers 17, 18 are in contact with the initial straight portions 16a, 19a, of the respective cam plates. The routers 6, 7 are started, to rotate the cutting blades, and then the ram 11 is operated to push the shaping equipment 5 along the rails 10, down the length of the table (arrow C). As the shaping equipment 5 is moved, the cam plates 16, 19, are still being biased into contact with the followers 17, 18, so the arms 13, 20, to which the cam plates 16, 19 are secured, move in response to the shape of the respective cam plate a the shaping equipment 5 travels along.

Thus, the routers 6, 7 are moved in the manner dictated by the profile of the corresponding cam plates 16, 19, cutting the appropriate profiles in the board components.

The speed of the ram 11 is increased once the required profiles have been cut and the cam followers reach the end of the corresponding cam plates. This speed increase may be effected by the operator, or arranged to occur automatically once the ram 11 has reached a predetermined point in its travel.

Figure 3:
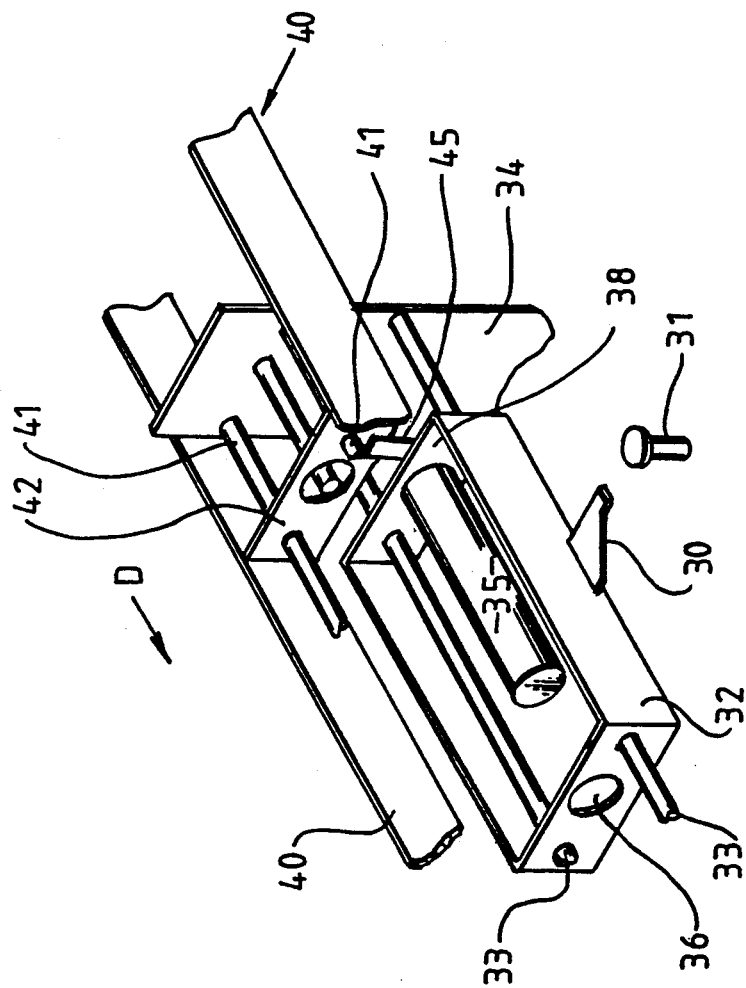
FIG. 3 is a cut-away isometric view of part of the apparatus of a second embodiment of the present invention.

Referring to FIG. 3 and a second preferred embodiment of the invention, a single cam plate 30 is arranged to bear against a cam follower 31 secured to one end of the support table (not shown). The cam plate 30 is rigidly secured to the side of a rectangular frame 32, which is supported in a vertical plane by through-rods 33 mounted between plates 34 (only one of which is shown) which are secured to the bearings (not shown) as described with reference to FIGS. 1 and 2.

The frame 32 is movable in a horizontal plane by a pneumatic cylinder 35 secured to the centre of one end 38 of said frame 32 and bearing against the plate 34. The travel of the cylinder 35 is limited by a limiting screw (not shown) which extends through an aperture 36 in the opposite end 37 of the frame. The screw is adjustable in length. One router 6 (not shown) is attached to, and moves with, the frame 32.

The other router 7 (not shown) is attached to and moves with the second frame 40, only part of which is shown. The frame 40 and its associated through-rods 41 and pneumatic cylinder (not shown) are directly above, and a mirror image of, the lower frame 32 and its associated equipment.

A stop 45 is rigidly secured to one end wall 42 of the frame 40, and the end of the stop is arranged to contact the outer surface of the end wall 38 of the frame 32.

Except as described above, the remainder of the apparatus is the same as the first preferred embodiment.

The above-described apparatus is used as follows: as described above for the use of the first preferred embodiment, the pneumatic cylinders are arranged to bias the cam plate 30 into engagement with the follower 31, the routers are started, and the ram 11 is operated to push the shaping equipment down the length of the table.

As the frames 32, 40 and the associated routers 6, 7 move down the length of the table, the frame 40 is urged in the direction of arrow D by its pneumatic cylinder, and this presses the stop 45 hard against the frame 32, so that both frames 32, 40, and their routers follow the contour of the cam plate 30, and the routers therefore cut complementary profiles on each of the associated board components.

The fact that only a single cam plate is used means that any minor inaccuracies in the cam profile are self-compensating, since they appear in both components.

In the case of a typical bench-top, only part of the cam profile is required to be cut on the upper board component, and this is achieved simply by limiting the stroke of the upper pneumatic cylinder, using the limiting screw. Once the end of the cylinder contacts the limiting screw, the cylinder, and hence the associated frame and router, can travel no further in the direction of arrow D, and the lower frame and router continue on their own, since the lower pneumatic cylinder has not yet reached the end of its stroke.

It will be appreciated that the shape of the profile cut in each board component (for either embodiment) may be varied as required, simply by altering the corresponding cam shape.

We claim:

1. Apparatus for cutting shaped edges on two components simultaneously, said apparatus comprising:
    a support table for supporting said two components;
    means for securing said components to said table such that the edges to be shaped lie opposite to, but spaced apart from, each other;
    a shaping means mounted upon said table and movable relative thereto between said components, so as to simultaneously cut complementary profiles for said shaped edges on both said components;
    cam means associated with said shaping means and arranged to guide said shaping means for at least part of its travel relative to said components, so as to cut said profiles in said components;
    the support table being slotted between said components, said shaping means including a movable frame which support two routers, said routers being mounted so that the router blades rotate in opposite senses.

2. Apparatus as claim in claim 1 wherein the movement of said frame is pneumatically controlled.

3. Apparatus as claim in claim 1 wherein the movement of said frame is pneumatically controlled.

4. Apparatus as claimed in claim 1 wherein said cam means includes two cam plates each having the required profile for said shaped edges, and one pair of co-axial cam followers against one of which each cam plate is biased, one cam plate guiding one router only.

5. Apparatus as claimed in claim 1 wherein said cam means comprises a single plate, having the required profile for said shaped edges, and one co-axial cam follower against which the cam plate is biased, said cam plate being so arranged as to guide two routers.

* * * * *